3,403,548
VIBRATING WIRE WITH PHASE
RESONANCE INDICATION
Miloš Petrik and Jiři Kratochvil, Prague, Czechoslovakia,
assignors to Vyzkumny ustav automatisacnich Prostredku, Prague, Czechoslovakia, a corporation
Filed June 28, 1966, Ser. No. 561,229
Claims priority, application Czechoslovakia, July 10, 1965,
4,420/65, 4,421/65
6 Claims. (Cl. 73—88.5)

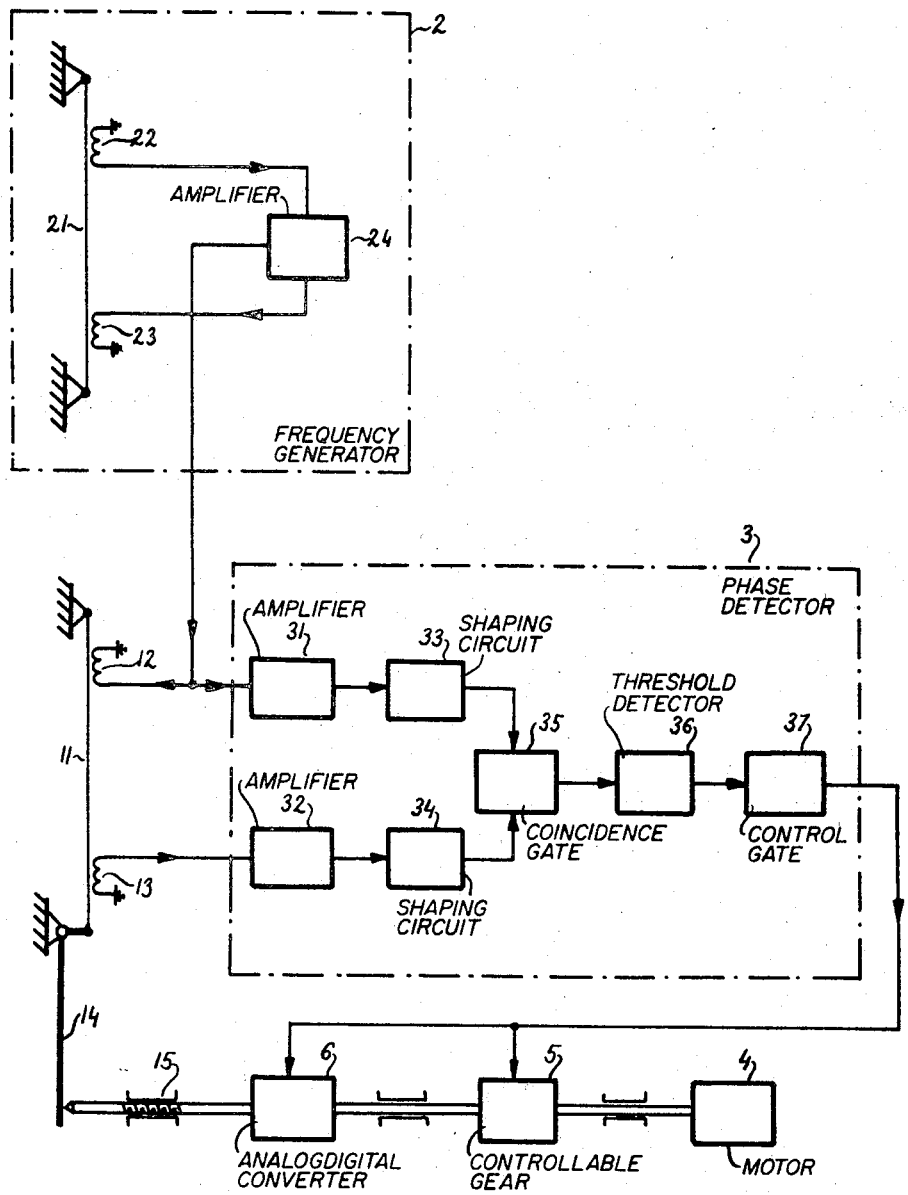

ABSTRACT OF THE DISCLOSURE

A highly sensitive vibrating wire measurement apparatus compares the phases of a first signal representing the vibrating frequency of a first wire and a second signal representing the vibrating frequency of a second wire that is excited by the first signal. A positioning device responsive to the phase difference between the first and second signals adjusts the tension of the second wire in a direction to equalize the vibration frequencies of the two wires. A pick-up device indicates the frequency of the second wire when the positioning device comes to rest.

This invention relates to vibrating wire measurement devices and, more particularly, to vibrating wire devices employing resonance techniques for the measurement of physical quantities translatable into a proportional wire tension. Accordingly, a general object to the invention is to provide new and improved devices of this character.

In the measurement of certain types of physical quantities such as mechanical deformations, use has been made of a pair of coupled vibrating wires. Typically, one wire is placed under a selectable tension and the other under a tension proportional to the magnitude of the physical quantity under test. One of the wires (the comparator wire) is excited with oscillations at the frequency of vibration of the other wire (the measurement wire), which senses the quantity being measured. A pick-off device is coupled to the excited comparator wire for translating the vibrations of the latter into an induced output voltage. The tension of the comparator wire is adjusted until resonance is achieved, i.e., until the natural frequency of vibrations of the comparator wire corresponds to the frequency of the exciting current from the measurement wire. At this time, the induced voltage amplitude at the output of the pick-off device is a maximum. Means are provided for reading out the value of comparator wire tension when an indicator coupled to the pick-off device indicates a maximum amplitude of the induced voltage.

The main disadvantage of the above-described arrangement is that the amplitude sensitivity of the induced voltage around the resonant point is degraded by the physical characteristics (e.g., damping factor) of the comparator wire as well as by the efficiency of excitation and other external phenomena. This relatively low sensitivity is extremely detrimental when attempts are made to automate the measurement system, since in the latter case the accuracy of the comparator tension read-out, (and thus of the value of the measured quantity), is a direct function of such sensitivity.

Another object of the invention, therefore, is to improve the sentitivity of response of a vibrating wire measurement system employing resonance techniques.

The above and related objects are attained in accordance with the invention by employing, in place of the amplitude characteristics of the comparator wire around resonance, the relative phase characteristics of the exciting current from the measurement wire and of the induced voltage at the output of the comparator wire pick-off device. The relative phases of these two signals are substantially equal at resonance. Means are provided for continually adjusting the tension of the comparator wire in one direction until resonance occurs, i.e., until the natural frequency of the comparator wire under such tension corresponds to the frequency of the exciting current from the measurement wire. The resulting equality of the phases of the exciting current and the induced voltage is manifested by an output signal from a highly sensitive phase detector arrangement coupled thereto. This output signal disables the adjusting means. The corresponding tension of the comparator wire is indicated by a read-out device (preferably an analog-to-digital converter) driven by the adjusting means.

With this arrangement, a high sensitivity of differential phase between the exciting current and the induced voltage occurs around the resonant point. This sensitivity is substantially independent of the damping factor of the comparator wire and other external parameters.

The nature of the invention and its various advantages are set forth more fully in the following detailed description taken in conjunction with the appended drawing, in which the single figure depicts an illustrative vibrating wire measurement system in accordance with the invention.

Referring in more detail to the drawing, it will be assumed that a suitable physical quantity is to be measured by a vibrating wire system employing a measuring wire 21 and an identical comparator wire 11 coupled thereto. The measurement wire 21 is arranged, in a conventional manner, such that its tension (and therefore its natural frequency) is proportional to the value of the physical quantity being measured. The measuring wire 21 is excited into vibrations by a first exciting coil 23 fed from a conventional amplifier unit 24. The vibrations at the resulting natural frequency of the wire 21 are converted to an output current by a first pick-up coil 22. This current is amplified in the unit 24 and routed to a second exciting coil 12 of the comparator wire 11. The measurement wire 21, the coils 22 and 23, and the unit 24 effectively form a frequency generator 2, the frequency of which is proportional to the tension of the wire 21 and thus to the value of the quantity being measured.

The tension of the comparator wire 11 is adjusted by a straining lever 14 controlled by a micrometer screw 15. The latter is normally coupled to the output shaft of a motor 4 through an electromagnetically controllable gear 5. A suitable read-out device, such as an analog-to-digital converter 6, is coupled between the gear 5 and the micrometer screw 15 for digitizing the relative angular position of the associated shaft. This angular position, in turn, is determined by the tension of the comparator wire 11.

The exciting current at the output of the frequency generator 2 is also coupled through a first amplifier 31 to a first shaping circuit 33. The output of the circuit 33 is a first succession of pulses having a period determined by the frequency of the exciting current. The output of the shaping circuit 33 is applied to a first input of a coincident gate 35.

A second pick-up coil 13 is coupled to the comparator wire 11 for converting vibrations thereof to an output voltage. The output voltage of the coil 13 is applied to the second input of the coincidence gate 35 through a second amplifier 32 and a second shaping circuit 34, which may be respectively identical to the first amplifier 31 and the first shaping circuit 33. With this arrangement, the output of the second shaping circuit 34 is a second succession of pulses occurring at a period determined by the frequency of the output voltage of the coil 13. The output of the coincidence gate 35 is coupled to an enabling input of a normally inoperative control gate 37 through a threshold detector 36, typically an integrating circuit. The gate 37 is adapted, when enabled, to disable the gear 5 and the converter 6 and thereby immobilize the shaft on which the micrometer screw 15 is mounted. The amplifiers 31 and 32, the shaping circuits 33 and 34, the coincidence gate 35, the threshold detector 36 and the control gate 37 collectively form a phase detector 3.

In the following description of the operation of the arrangement shown in the figure, it will be assumed that (a) the measurement wire is activated so that exciting current is supplied by the generator 2, and that (b) the gear 5 and the converter 6 are operative so that the rotation of the motor 4 in a predetermined direction causes the straining lever 14 to successively increase the tension of the wire 11 from an initial minimum valve. Under these circumstances, the tightening of the wire 11 by the rotation of the motor 4 causes the converter 6 to continually read out the digital equivalent of the angular position of the rotating shaft between the gear 5 and the micrometer screw 15. At the same time, the exciting current supplied by the generator 2 to the coil 12 force-excites the tensioned wire 11. As the tension of the wire 11 increases, its natural frequency increases until the latter approaches the resonant condition, i.e., until the natural frequency of the wire 11 approaches the frequency of the exciting current. As this resonant point is approached, the frequency and phase of the exciting current and the output voltage approach coincidence. Moreover, as resonance is approached, the differential phase between these latter two quantities varies rapidly with slight increases in the tension of the comparator wire. At resonance, the first and second successions of pulses at the output of the shaping circuits 33 and 34 are in frequency and phase coincidence. The coincidence gate 35 thereupon supplies a corresponding third succession of output product pulses to the threshold detector 36, which is assumed to be inoperative until a first predetermined number of pulses in the third succession have occurred so that accidental or erratic operation of the control gate 37 is avoided. When the detector 36 is triggered upon the occurrence of the required number of pulses in the third succession, the gate 37 disables the gear 5 so that the tension of the wire 11 remains set at the position corresponding to resonance. At this point, the digital-read out of the converter 6 corresponds to the tension of the wire 11. Since the wires 11 and 14 are presumed to be identical, the tension measured at the output of the converter 6 corresponds to that of the measuring wire 14 and thus to the amplitude of the measured quantity.

The high sensitivity of this arrangement is virtually independent of the degrading effects of wire damping and of fluctuations in the electronic components employed in the phase detector 3 and the generator 2. The resulting read-out accuracy of the system is therefore much greater than that which is possible with the use of resonance amplitude techniques.

In the foregoing, the invention has been described in connection with preferred arrangements thereof. However, since many other variations and modifications will now become obvious to those skilled in the art, it is accordingly desired that the breadth of the claims not be limited to the specific disclosure herein contained.

We claim:

1. In a vibrating wire measurement system of the type in which current at a first frequency excites a wire having an adjustable tension and in which the resulting forced vibrations thereof are translated into an induced voltage by a suitably located pick-up device, the improvement which comprises, in combination:

means for comparing the relative phases of said current and said induced voltage;

normally operative means for continually adjusting the tension of said wire in a selected direction; and means triggered when said relative phases are equal for disabling said adjusting means.

2. In a system as defined in claim 1, said comparing means comprising, in combination, means responsive to said current for deriving a first succession of pulses having a period determined by said first frequency; means responsive to said induced voltage for deriving a second succession of pulses having a period determined by the frequency of said induced voltage; and means for deriving a third succession of pulses upon the phase coincidence of said first and second successions of pulses.

3. In a system as defined in claim 2, said adjusting means comprising, in combination, a control shaft, means controlled by the angular position of said shaft for adjusting the tension of said wire, and normally operative means for rotating said shaft.

4. In a system as defined in claim 3, said disabling means comprising, in combination, threshold means for deriving a control signal upon the occurrence of a predetermined number of pulses in said third succession; and switching means responsive to said control signal for disabling said rotating means.

5. In a system as defined in claim 4, said system further comprising a read-out device coupled to said shaft for indicating the instantaneous tension of said wire.

6. In a system as defined in claim 5, said read-out device comprising means for digitizing the relative angular position of said shaft.

References Cited

UNITED STATES PATENTS

| | | | |
|---|---|---|---|
| 2,429,427 | 10/1947 | Rieber | 324—80 XR |
| 3,036,465 | 5/1962 | Dicke | 73—382 |
| 3,071,974 | 1/1963 | Peterson | 73—517 XR |

RICHARD C. QUEISSER, *Primary Examiner.*

C. A. RUEHL, *Assistant Examiner.*